United States Patent Office

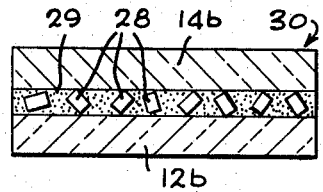
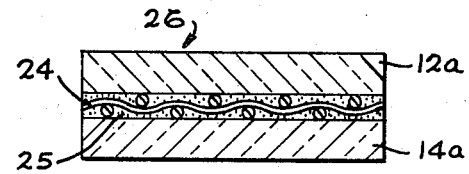
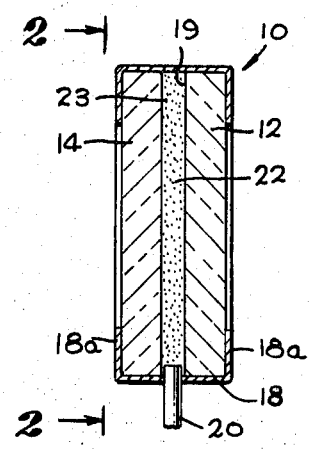
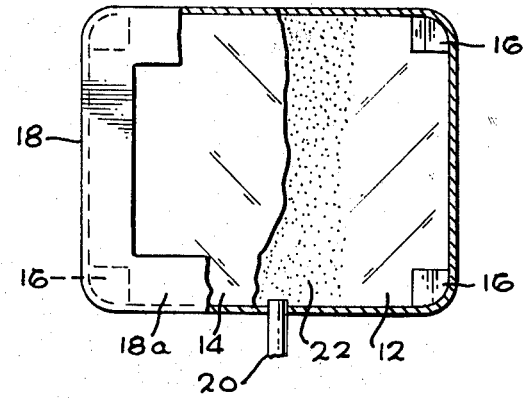
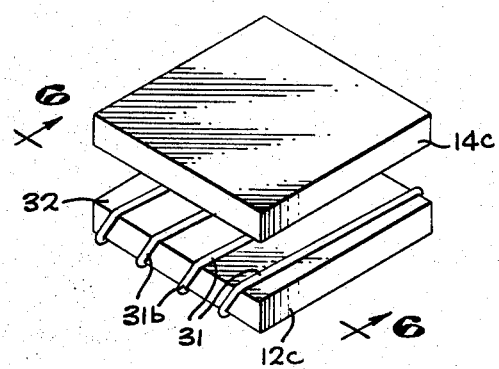
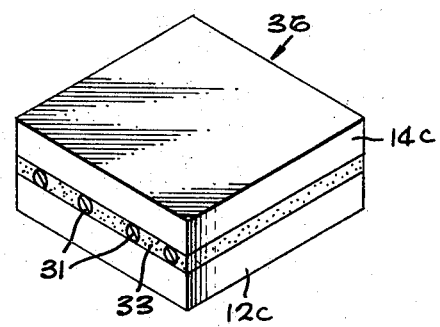
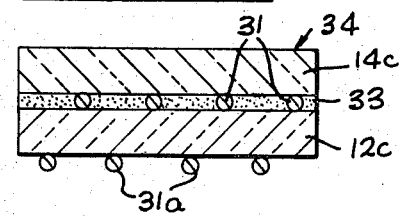
VERN E. HAMILTON
LUTHER M. ROSELAND
INVENTORS

3,558,422
Patented Jan. 26, 1971

3,558,422
GLASS LAMINATE AND BONDING MATERIAL THEREFOR
Vern E. Hamilton, Palos Verdes Estates, and Luther M. Roseland, Santa Ana, Calif., assignors, by mesne assignments, to McDonnell Douglas Corporation, Santa Monica, Calif., a corporation of Maryland
Filed June 7, 1965, Ser. No. 461,647
Int. Cl. B32b 17/10, 27/38, 27/40
U.S. Cl. 161—185
6 Claims

ABSTRACT OF THE DISCLOSURE

Glass laminate, e.g., a high strength safety glass or acoustical glass, adhesively bonded together by a cured transparent urethane polymer containing uncured epoxy resin, and preferably also including a chlorinated biphenyl, providing a tough adhesive layer highly adherent to the glass substrates and strongly resisting delamination of the glass layers; and an adhesive formultaion employed for bonding such glass laminate at room temperature, containing urethane polymer, epoxy resin, a polyamine or polyol curing agent, and preferably also including a chlorinated biphenyl, the amount of curing agent employed being sufficient to react only with the isocyanate groups in the urethane polymer at room temperature, the epoxy resin functioning in the urethane polymer adhesive formulation as a plasticizer, the epoxy resin also improving the adhesion of the formulation to the glass plates, and increasing the index of refraction of the cement bond to more closely approach and match the index of refraction of the glass plates.

---

This invention relates to the fabrication of safety glass or acoustical and architectural glass in the form of laminates comprising two or more glass plates, and to a novel adhesive composition designed particularly for bonding adjacent glass plates of said laminate, to produce laminated windows or lights having improved properties, and particularly improved strength characteristics.

In present practice for the manufacture of glass, for example, safety glass, a polyvinyl butyral sheet is positioned between adjacent glass plates, and the unit is subjected to heat and pressure to produce bonding of the adjacent plates by the polyvinyl butyral bonding material. However, by means of this procedure involving the application of substantial pressures a large number of stresses are built into the glass laminate. This reduces the ultimate strength of the laminated glass and also renders it prone to delamination.

Further, ordinary safety glass has characteristics such that when impacted, a relatively great impact force is required before the energy absorbing qualities of the laminate take effect, resulting in the formation of multiple cracks extending laterally outward from the point of impact. This means that if a person's head strikes a windshield formed from conventional safety glass, there will be a substantial impact force absorbed by the head before the glass cracks and functions in the nature of a net to absorb the shock impact. At relatively low temperatures, ordinary safety glass actually loses its characteristics as such, and tends to shatter when impacted, and at high temperatures the glass laminate tends to "give" excessively and the object striking the glass will tend to penetrate through the glass.

It is accordingly an object of this invention to provide improved glass laminates, particularly transparent glass laminates especially designed for use as safety glass or acoustical or architectural glass, such laminates being bonded by a strong, transparent adhesive.

Another object of the invention is the provision of glass laminates formed of a plurality of glass panels bonded together by an adhesive between each of the adjacent layers, such laminate being readily formed and having improved strength and resistance to delamination, particularly when employed as safety glass, and having improved sound absorption and energy dissipation properties.

Another object is to provide glass laminates, adjacent plates of which are bonded together by a controlled thickness of an adhesive, the fabrication of such laminates being carried out and the adhesive bond cured, without the application of high pressures and elevated temperatures, thus avoiding excessive stressing of the glass.

Still another object of this invention is to provide a novel adhesive composition for bonding adjacent glass plates to form a laminate as noted above, and providing a strong tough bond between such plates, and conferring other important characteristics on the resulting laminate.

A still further object of the invention is the provision of a novel procedure for compounding the adhesive composition of this invention., Yet another object is to provide a novel relatively stable mixture containing all of the components of the adhesive composition of the invention except one of the resin components, so that at the time of use, the adhesive composition can be readily prepared by incorporating such resin component into such mixture.

Other objects and advantages of the invention will appear hereinafter.

It has now been found that polyurethane-epoxy mixtures, and preferably including a chlorinated biphenyl, provide a strong, transparent bond between adjacent glass plates or panels, permitting formation of glass laminates or lights composed of a plurality of such plates by a bonding procedure which can be readily carried out. The urethane polymer-epoxy resin adhesive formulation of the invention employed as the bonding material between the adjacent glass plates has relatively low viscosity, permitting easy application and uniform flow between the adjacent surfaces of the plates being bonded, and permitting application of a controlled uniform thickness of bond between the plates, and forming a void-free bond. Further, the bond formed by the adhesive formulations of the invention have high adhesion to the glass substrates, and provide a tenacious bond therebetween.

By employing the novel fluid adhesive of the invention for bonding together glass panels, glass laminates can be readily fabricated by curing the bonding adhesive at ambient temperature and without the application of pressure. When producing safety glass by means of the liquid adhesive of the invention, the resulting laminate has high adhesive strength and toughness over a broad temperature range of the order of about −100° F. to +250° F., and the ultimate strength of the laminated panel is increased and the panel is more resistant to delamination.

Of particular advantage in the manufacture of safety glass, the invention procedure employing the novel adhesive hereof results in the production of a glass laminate having improved energy absorbing net-like qualities over a broad range of temperature of from about −100° F. to +250° F. so that upon impact, only a relatively minor amount of force is required to utilize such net-like quality of the laminate. Also, since no large pressures are needed for bonding the glass laminate, there will be a minimum of built-in stresses, resulting in the above noted increased ultimate strength and delamination resistance of the laminate.

In addition to the above properties, when the glass laminate is employed as acoustical or architectural lights, e.g., for partitions or panels, the glass laminate has sound absorption and energy dissipation properties over a broad acoustical range and permits homogeneity of dyeing when employing the adhesive of the invention, for producing colored panels.

The glass plates employed to form glass laminates utilizing the adhesive of the invention can be of any desired thickness, e.g., from about ⅛ inch to about ½ inch thick, and the glass plates can be formed from any of the types of glass generally employed for fabricating safety glass and acoustical glass such as the usual soda lime glass. The thickness of the adhesive bond formed between the adjacent glass plates can vary, but is relatively thick. Thus, for example, in the production of safety glass, a cured adhesive bond thickness of about 0.012 to about 0.020 inch thick can be provided, and for acoustical or architectural glass, substantially thicker cured adhesive bonds can be provided, e.g., of the order of about 0.040 to about 0.060 inch thick. The procedure and means for providing such relatively thick adhesive bonds according to the invention will be described more fully hereinafter. The number of plates bonded together to form a laminate and the number of adhesive or glue lines between adjacent plates of such laminate can of course be varied. Thus, for safety glass, for example, a glass laminate can be provided according to the invention having two glass plates bonded together with one adhesive bond between plates, and for acoustical or architectural glass up to five glass plates can be provided in the laminate, employing therein up to four adhesive or glue lines. However, it will be understood that the invention is not to be taken as limited by any particular thickness of glass plates, thickness of cured adhesive bond employed for bonding the plates, or the number of glass plates or glue lines in the resulting laminates.

Various types of liquid urethane polymers or elastomers can be employed to produce the adhesive formulations employed as bonding material for the glass plates according to the invention. These materials can be cured to a strong, flexible or rubbery solid material. Illustrative of the liquid urethane polymer base material of these adhesive formulations are the "Adiprene L" series of liquid urethane elastomers marketed by Du Pont. These materials are fully saturated polymers which contain, e.g., from about 4.0% to about 10% isocyanate groups by weight. Typical specific examples of such liquid urethane elastomers are the Adiprenes L–100, L–167, and L–315. The L–100 material contains about 4.0% to about 4.3% isocyanate groups by weight, the L–167 material about 6.1% to about 6.5% isocyanate groups, and the L–315 material about 9.2% to about 9.6% isocyanate groups. These polymers are cured by reaction of the isocyanate group with curing agents, e.g., polyamines or polyol compounds. These materials can also be cured by reaction with the moisture present in the air, but this is difficult to control consistently with varying relative humidity, and requires relatively prolonged curing time and is therefore not preferred. A preferred urethane elastomer for purposes of the invention is Adiprene L–100.

The physical properties of Adiprene L–100 are set forth in the table below:

TABLE I

Specific gravity: 1.06
Viscosity at 86° F.: 14000–19000 cps.
Viscosity at 212° F.: 500–600 cps.
Appearance: A honey-colored liquid
Odor: None
Flash point: 480° F.
Solubility: Soluble in most common solvents; toluene, methyl ethyl ketone, ethyl acetate, $CCl_4$ Other examples of suitable urethane polymers which can be employed include the polyester based polyurethanes such as those marketed as the Vibrathanes by Naugatuck Chemical Company, and the polyether based polyurethanes such as the product marketed as Multrathane F–196 by Mobay Chemical Company.

Specific examples of polyamine and polyol curing agents which are preferably employed in the liquid urethane polymer adhesive formulations of the invention are 4,4′ - methylene-bis-(2-chloroaniline), known as MOCA, triethanolamine, 1,4-butanediol, castor oil, diethylene triamine, di-amino diethylamine, and the like. MOCA has been found particularly suitable.

We have found that the addition of an epoxy resin, e.g., the reaction product of epichlorhydrin and bisphenol A, preferably in the form of a liquid, to the adhesive formulation of urethane polymer is particularly advantageous. The epoxy resin functions in the urethane polymer adhesive formulation hereof, as a plasticizer or diluent, and lengthens the work life or duration of the period of lubricity and flowability of the adhesive formulation. Also, the epoxy resin has a high index of refraction, e.g., of the order of about 1.58, and thus contributes to increasing and improving the index of refraction of the cement bond to more closely approach and match the index of refraction of the glass plates. Further, the incorporation of the epoxy resin into the urethane polymer adhesive improves the adhesion of the formulation to glass plates as compared to a urethane polymer adhesive formulation in the absence of such epoxy resin.

In addition to the preferred epoxy resins produced by reaction of epichlorhydrin and bisphenol A (the diglycidyl ether of bisphenol A), other epoxy resins can be employed in the urethane polymer adhesive formulations hereof, including glycidyl ethers of glycerol, glycidyl ethers of bisphenol F, glycidyl ethers of tetrakis (hydroxyphenyl) ethane, and the like. Also, epoxy resins produced by reaction of epichlorhydrin, butadiene dioxide or diglycidyl ether, with mononuclear and polynuclear phenols such as resorcinol, hydroquinone, 4,4′-dihydroxyl biphenyl dihydroxyl diphenyl sulfone may be employed.

Preferably, although not necessarily, both the urethane and epoxy resin are chosen with respect to molecular weight, so that they are in liquid form. However, for example, if desired, a solid epoxy resin can be employed, e.g., by diluting same with a suitable diluent such as the chlorinated biphenyl component of the adhesive formulation.

The proportions of epoxy resin to urethane polymer in the adhesive formulation of the invention can range by weight from about 10 parts of epoxy resin and 90 parts of urethane polymer, to about 60 parts of epoxy resin and about 40 parts of urethane polymer, based on 100 parts of the sum of both the urethane polymer and epoxy resin. For safety glass, within the above noted range, preferably a minimum of about 70 parts of polyurethane and a maximum of about 30 parts of epoxy resin is employed, and for acoustical or architectural glass, preferably a maximum of about 60 parts of polyurethane and a minimum of about 40 parts of epoxy resin is employed. When employing the larger amounts of polyurethane and the smaller amounts of epoxy resin within the above noted range for producing safety glass, a tough and elastic laminate is thereby provided. When employing smaller amounts of polyurethane and larger amounts of epoxy resin for producing acoustical or architectural glass, a softer cured bond is provided.

An amount of polyamine or polyol curing agent is employed which is less than stoichiometric for the combination of both the polyurethane and the epoxy resins present in the adhesive formulation. That is, the amount of curing agent preferably employed is such that most or practically all of the curing agent present reacts with all of the isocyanate groups in the urethane prepolymer, at room temperature. Since the above noted curing agent employed for the urethane polymer reacts very slowly with epoxy resins at room temperature, there is essentially no need for the presence of excess curing agent over and above that amount which reacts stoichiometrically with the polyurethane. In other words, the curing agents employed in the resin formulation of the invention, at about room temperature react substantially entirely with the urethane resin for curing same and there is substantially no reaction of such curing agent with the epoxy resin present in the adhesive. It is thus believed that the epoxy resin present remains in the adhesive formulation in its initial form and functions essentially as a plasticizer or diluent. However, the invention is not to be taken as limited by any theory as to the function of the epoxy resin in the adhesive formulation of the invention.

The amount of curing agent which can be employed in the resin formulation of the invention can vary between about 4 to about 20 parts by weight per 100 parts of the urethane polymer component. It has been found preferable to employ about 10 to about 18 parts by weight of the curing agent per 100 parts of the urethane polymer component. It has been found from experience that the use of approximately stoichiometric proportions of curing agent with respect to the polyurethane component, e.g., about 13 parts of curing agent such as MOCA per 100 parts by weight of the polyurethane component, provides superior results.

According to preferred practice, there is incorporated into the urethane polymer formulation, in addition to the epoxy resin noted above, a chlorinated biphenyl. Suitable chlorinated biphenyls for purposes of the invention are available in the trade; for example, they are made and sold by the Monsanto Chemical Company under its trademark designation "Aroclor." In terms of the trademark designation of the Monsanto Chemical Company, Aroclor 1221, a preferred form of this material for purposes of the invention, contains 21% by weight of chlorine. Generally, it has been found that chlorinated biphenyls containing from about 15 to about 25% by weight of chlorine produce best results.

Incorporation of the chlorinated biphenyl component into the resin formulation of the invention aids in reducing the viscosity of the adhesive formulation, advantageously increases the index of refraction of the adhesive bond, and aids to increase the work life or period of duration of lubricity of the resin formulation during working.

The amount of chlorinated biphenyl which can be incorporated into the adhesive formulation of the invention can range from about 3 to about 50 parts per 100 parts of both, that is the sum of, the urethane polymer and epoxy resin components, by weight. Preferably, between about 5 and about 30 parts of the chlorinated biphenyl is employed for safety glass, but in the most desirable formulations for safety glass, to obtain a strong tough bond, about 5 to about 20 parts of the chlorinated biphenyl is utilized, per 100 parts by weight of the sum of the urethane and epoxy resin components. Preferably, between about 20 to about 50 parts of chlorinated biphenyl is employed for acoustical glass panels, per 100 parts by weight of the sum of the urethane and epoxy resin components.

Although the chlorinated biphenyl is a preferred component in the adhesive formulation hereof, such chlorinated biphenyl can be omitted where viscosity of the adhesive composition and the index of refraction of the adhesive bond are satisfactory without incorporation of the chlorinated biphenyl.

As an optional component, ultra-violet light absorbers can be added to the adhesive formulation. Illustrative of such light absorbers are the compounds 2(2'-hydroxy, 5'-methyl phenyl) benzothiazole, marketed as Tinuvin P, and 2 - hydroxy - 4 - methoxy benzophenone, marketed as Cyasorb UV-9. These ultra-violet light absorbers can be employed in amounts ranging from, for example, about 0.5 to about 3% by weight of the adhesive formulation.

Also, there can be added optionally to the adhesive formulation a trace of a whitener, e.g., the whitener marketed as Perox blue, and understood to be an anthraquinone dye. The trace amount of whitener thus added to the formulation tends to mask off any yellow coloration which may be imparted to the bonding or adhesive layer following curing.

The following are examples illustrating the novel adhesive formulation of the invention which can be employed in producing improved glass laminates in the form of safety glass, or acoustical or architectural glass, the amounts set forth being given in terms of parts by weight.

| Components | Safety glass | | | | Acoustical glass | | | | |
|---|---|---|---|---|---|---|---|---|---|
|  | A | B | C | D | E | F | G | H | I |
| Adiprene L-100 | 75 | 75 | 90 | 70 | 60 | 60 | 55 | 50 | 40 |
| Epon 828 | 25 | 25 | 10 | 30 | 40 | 40 | 45 | 50 | 60 |
| Aroclor 1221 |  | 15 | 5 | 20 |  | 20 | 15 | 25 | 40 |
| MOCA | 10 | 10 | 12 | 10 | 9 | 9 | 9 | 10 | 8 |

NOTE.—Adiprene L-100, liquid urethane elastomer, marketed by Du Pont. Epon 828, liquid epoxy resin believed to be a reaction product of epichlorhydrin and bisphenol A marketed by Shell Chemical Corporation. Aroclor 1221, a chlorinated biphenyl containing 21% combined chlorine by weight, marketed by Monsanto Chemical Co. MOCA, 4,4' methylene bis-(2-chloroaniline).

The following examples further illustrates the adhesive formulation of the invention incorporating ultra-violet light absorbers therein:

COMPOSITION J

Safety glass

| | Parts by weight |
|---|---|
| Adiprene L-100 | 80 |
| Epon 828 | 20 |
| Aroclor 1221 | 10 |
| Tinuvin P | 2.8 |
| MOCA | 11 |

COMPOSITION K

Acoustical glass

| Adiprene L-100 | 60 |
|---|---|
| Epon 828 | 40 |
| Aroclor 1221 | 30 |
| Tinuvin P | 1.4 |
| Cyasorb UV-9 | 1.4 |
| MOCA | 10 |

Tinuvin P is 2(2'-hydroxy, 5'-methyl phenyl) benzothiazole

Cyasorb UV-9 is 2-hydroxy-4-methoxy benzophenone

In the formations A to K above, instead of Adiprene L-100, other urethane polymers can be employed such as Adiprene L-167 containing about 6.1% to about 6.5% isocyanate groups, and the like; in place of the Epon 828 epoxy resin of the above formulations other epoxy resins such as the glycidyl ether of glycerol or the glycidyl ether of bisphenol F can be employed; and in place of Aroclor 1221 in the above compositions, other chlorinated biphenyls can be employed such as a chlorinated biphenyl containing about 17% chlorine by weight. Also, instead of MOCA employed in the above compositions A to K, other curing agents such as triethanolamine can be employed.

According to a preferred mode of procedure, particularly employing the above noted MOCA as curing agent, all of the components of the adhesive formulation are mixed together except the liquid urethane polymer, including epoxy resin, chlorinated biphenyl, and MOCA. This liquid remains clear with no suspended crystals of MOCA at room temperature, and the MOCA in this mixture has substantially no curative affect on the mixture at room temperature over a period of several days. When the adhesive is to be used, this mixture is then mixed with the urethane polymer, with no heating required to melt the MOCA crystals during mixing. This mode of mixing and applying the adhesive prevents the formation of MOCA crystals which ordinarily occurs when a mixture of MOCA and Aroclor are formed without the epoxy, and also permits a more homogeneous mixture of the various refractive indices of the components. Also this technique enables the provision of a mixture of all the components of the adhesive formulation except the urethane polymer which can be stored for a period, and when the adhesive is to be used according to the invention, the urethane polymer can simply be added in suitable proportions as noted above. This permits quick and proper provision of the adhesive composition for use, with minimum danger of improper mixing of all of the various components of the formulations by relatively unskilled operators.

Thus, such a mixture suitable for incorporation therein of a urethane polymer or prepolymer to provide an adhesive formulation according to the invention, can comprise about 10 to about 60 parts by weight of epoxy resin, about 3 to about 50 parts by weight of a chlorinated biphenyl, and MOCA in suitable amount, preferably about 2 to about 18 parts by weight. Such a mixture is completely free of crystals of MOCA and can be stored at room temperature for days substantially without curing, and can be stored over much longer periods of time substantially without curing if maintained at reduced temperatures. The urethane polymer is then added to this mixture at the time of use, in an amount such that the proportions of all of the components of the adhesive composition are within the ranges noted above. This can be accomplished readily by adding an amount of urethane polymer such that the total amount of epoxy resin and urethane polymer components present in the resulting adhesive composition is about 100 parts by weight.

As previously noted, in the production of safety glass and acoustical glass laminates used for sound absorption as partitions and panels, a relatively thick glue line or adhesive bonding line of controlled thickness is required. For this purpose, when fabricating the glass laminate and applying the adhesive between the adjacent glass plates or panels to be bonded, a spacer means is usually employed. Thus, for example, the adhesive can be applied to one or both surfaces of adjacent glass panels to be bonded together and the glass panels are brought together with the proper thickness of adhesive bond provided by using spacers to adjust the desired adhesive thickness, or the glass panels can be initially held together as a unit with spacers, corresponding to the desired thickness of bond between adjacent surfaces, the edges of the laminate can be taped and adhesive inserted into the space between the adjacent glass panels enclosed by the periphery of tape.

According to another embodiment for controlling the thickness of the adhesive bond, a loosely woven glass mat can be impregnated with the adhesive, or the adhesive can be applied over the mat and the adjacent glass plates than brought together with the adhesive-impregnated woven mat sandwiched between the plates. Alternatively, such mat can be placed between the glass plates or panels, and with the unit supported in this position, the adhesive can be introduced into the space occupied by the mat, impregnating the mat and filling such space. The glass mat preferably should have an index of refraction close to that of the adhesive bond. The glass mat functions as a carrier for adhesive, as a spacer for the glass plates and as a reinforcement for the adhesive bond and the laminate as a whole.

Other alternative means for properly spacing the adjacent glass plates and providing the desired bond thickness include the employment of cured particles of the adhesive or of a like adhesive, or glass fibers, randomly dispersed in the liquid adhesive, such particles having a size such that a uniform layer of the particles between the adjacent plates functions as a spacer to provide the desired space or bond thickness between plates. Also, a cured layer of the adhesive can be provided on one surface of a glass plate and by applying a thin layer of the liquid adhesive to the adjacent surface of the other glass plate the two plates can be bonded together with a total controlled thickness of bonding material. Also, felt in the form of a loose random fiber glass mat can be applied to the surface of a plate, adhesive applied to impregnate the mat and the other glass plate applied to form a glass laminate having a controlled thickness.

The accompanying drawing illustrates production of glass laminates employing an adhesive as bonding material, according to the invention principles.

In the drawing:

FIG. 1 is a view in elevation illustrating introduction of adhesive in a space of predetermined thickness between two glass plates maintained properly separated by the use of separator means;

FIG. 2 is a side view of the assembly of FIG. 1, taken on line 2—2 of FIG. 1, showing one of the glass plates, partly broken away for clarity;

FIG. 3 illustrates a section of a glass laminate having spacer means in the form of a woven glass mat impregnated with adhesive to form a bond of controlled thickness;

FIG. 4 shows another embodiment of the invention employing particles of cured adhesive of given size according to the invention, and employed as spacer means between adjacent glass plates bonded together with the adhesive of the invention;

FIG. 5 illustrates one step in the provision of another modified form of spacer means between two glass plates;

FIG. 6 shows a cross section of the assembly of FIG. 5 when assembled and following introduction and curing of the adhesive in the space between adjacent plates; and FIG. 7 is a perspective of the assembly of FIG. 6 following removal of the glass filaments from the outer surface and sides of the laminate.

It will be understood that the illustrations in the drawing are exaggerated for purposes of greater clarity.

Referring to FIGS. 1 and 2 of the drawing, a glass laminate 10 according to the invention is fabricated by placing a pair of glass plates or panels 12 and 14 adjacent each other and separated by a set predetermined distance from each other by means of suitable spacers 16 composed, for example, of pieces of previously cured similar adhesive or cement, inserted between the two plates at the four opposite corners of these plates as seen in FIG. 2. With this unit held together, a suitable tape is wound around the outer periphery of the glass plates, as indicated at 18, and turned up at the opposite edges as indicated at 18a, and enclosing the outer periphery of the space 19 provided between the adjacent plates. The resulting unit is then maintained in this position shown in FIG. 1, by suitable mounting means (not shown), and a filler hose 20 is inserted through the tape 18 adjacent the space 19, and having its discharge end protruding into such space. A liquid adhesive composition according to the invention, for example, Composition B or Composition F above, is introduced via the filler hose 20 into the space 19 of controlled thickness between the glass plates, until such space is completely filled with adhesive 22, but without applying any substantial pressure which would cause the plates to bulge away from each other. The hose 20 is then removed and the adhesive 22 now filling the space 19 is permitted to cure at room temperature. The tape 18 is then removed, providing a glass laminate 10 according to the invention, which can be employed as safety glass or architectural acoustical panels or lights. If desired, in employing the laminate formed as described above in FIGS. 1 and 2, the glass laminate may be cut so that the spacers 16 are eliminated from the assembly. Also, if desired, the assembly shown in FIGS. 1 and 2 can be inclined during introduction of the liquid adhesive into space 19, to reduce the pressure head required to fill such space with the adhesive. Alternatively, a vacuum may be applied adjacent the upper end 23 of the gap 19 by suitable means (not shown) and the adhesive drawn into the gap, or a combination of vacuum and pressure may be used to effectively cancel out all differential pressure on the glass panels 12 and 14.

Referring to FIG. 3, illustrating another means for providing a controlled thickness of cured adhesive according to the invention, between a pair of glass plates, a loosely woven glass mat indicated at 24 is impregnated with an adhesive composition 25 according to the invention, e.g., Composition A or Composition E above, and such adhesive-impregnated fiber glass mat is sandwiched between a pair of glass plates 12a and 14a. A modest pressure is applied to the two plates 12a and 14a and the adhesive is cured at room temperature to provide a glass laminate 26 having utility as safety glass, or as acoustical or architectural glass. Alternatively, a vacuum may be used as previously described, to draw the composition into the space between plates 12a and 14a. The fiber glass mat employed should have an index of refraction of about 1.56 or close enough to that of the cured adhesive bond so that the fibers are invisible after curing is completed.

In FIG. 4 there is illustrated another means for providing a controlled adhesive bond thickness between the glass plates, according to the invention. In this embodiment, cured adhesive particles 28 of a controlled size, e.g., produced from Composition C above, are distributed over the surface of a glass plate 12b and a liquid adhesive of composition similar to that of the cured particles 28, that is, liquid Composition C, is distributed at 29 over the surface of the glass plate 12b, essentially enveloping and covering the cured particles 28 in the layer. A glass plate 14b is then applied over this layer of adhesive 29 having the cured particles 28 dispersed therein, and a modest pressure is applied to the plates 12b and 14b, squeezing the plates together so that the thickness of the space and the adhesive bond between the plates is substantially that of the thickness of the particles 28. Alternatively, the particles may be embodied in the adhesive directly by inclusion into the composition before application to the panels. After curing at approximately room temperature, a glass laminate 30 is provided which is suitable for use as safety glass according to the invention.

Now referring to FIGS. 5, 6 and 7 of the drawing, there is shown a still further embodiment for providing a set predetermined distance between the glass plates of the laminate and a predetermined adhesive bond thickness. Referring first to FIG. 5, a glass plate 12c is wound with elongated filaments at 31 of glass or of previously cured adhesive identical to that employed for bonding the plates, i.e. Composition H noted below, such filaments being essentially continuous, forming a spiral arrangement around two faces and the opposite end portions of the glass plate 12c. The filaments 31 employed preferably are those which have an index of refraction as nearly identical as possible to the index of refraction of the adhesive layer 33 applied therebetween.

An adhesive composition according to the invention, such as Composition H is distributed over the inside surface 32 of glass plate 12c in the spaces between the spirally wound filaments 31 to a height slightly greater than the thickness of such filaments, and the other glass plate 14c is placed thereover. The resulting unit is then subjected to slight pressure and the adhesive is cured at substantially room temperature. The resulting laminate is illustrated at 34 in FIG. 6. The portions of filaments 31a extending along the outside surface of the glass plate 12c and the portion of filaments 31b extending over the opposite edges of glass plate 12c are then removed as by means of a suitable cutting tool such as a razor, and the finished laminate is shown at 36 in FIG. 7. This laminate has properties according to the invention making it particularly useful as architectural or acoustical glass for partitions and panels.

From the foregoing, it is seen that the novel adhesive formulation of the invention is particularly suited as a bonding material or adhesive for the production of glass laminates which have particular utility and outstanding properties for use as safety glass or as acoustical or architectural glass, and the adhesive provides a tough layer of a urethane-epoxy resin which is highly adherent to the glass substrates and strongly resists delamination of the glass plates or layers. The urethane polymer adhesive formulations containing an epoxy resin and curing agent preferably in certain proportions, and preferably also including a chlorinated biphenyl, according to the invention, employed to produce glass laminates as described above, possess a number of other advantages, including low viscosity for proper flow over the entire surface between adjacent layers of the laminate, ability to cure rapidly at normal temperature and without employing high pressures, high adhesion to the glass substrate under severe environmental conditions, and good optical qualities of clarity and high index of refraction of the adhesive bond, closely approaching those of the glass layers.

While we have described particular embodiments of the invention for the purpose of illustration, it should be understood that various modifications and adaptations thereof may be made within the spirit of the invention, and with the scope of the appended claims.

We claim:

1. A glass laminate comprising at least two glass plates adhesively bonded together by a cured urethane polymer containing epoxy resin, said epoxy resin being in the form of an epichlorohydrin-bisphenol A condenation product, said urethane polymer cured 4,4-methylene-bis-(2-chloroaniline) employed only in an amount which reacts stoichiometrically with the urethane polymer.

2. A glass laminate comprising at least two glass plates adhesively bonded together by a cured urethane polymer containing epoxy resin, said epoxy resin being in the form of a epichlorohydrinbisphenol A condensation product, and a chlorinated biphenyl, said urethane polymer cured by a 4,4'-methylene-bis-(2-chloroaniline) employed only in an amount which reacts stoichiometrically with the urethane polymer.

3. A glass laminate comprising at least two glass plates adhesively bonded together by a cured urethane polymer containing epoxy resin in the form of an epichlorohydrin-bisphenol A condensation product, and a chlorinated biphenol containing about 15 to about 25% by weight of chlorine, said urethane polymer cured by 4,4'-methylene-bis-(2-chloroaniline) employed only in an amount which reacts stoichiometrically with the urethane polymer.

4. A transparent high strength safety glass highly resistant to delamination and having energy absorbing net-like qualities over a broad temperature range, which comprises a plurality of glass plates, adjacent plates being adhesively bonded together with a predetermined thickness of a cured urethane polymer containing epoxy resin, said epoxy resin being in the form of a epichlorohydrin-bisphenol A condensation product, said urethane polymer cured by 4,4'-methylene-bis-(2-chloroaniline) employed only in an amount which reacts stoichiometrically with the urethane polymer.

5. A high strength safety glass highly resistant to delamination and having energy absorbing net-like qualities over a broad temperature range, which comprises a plurality of glass plates, adjacent plates being adhesively bonded together by a predetermined thickness of a cured urethane polymer containing epoxy resin in the form of a epichlorohydrinbisphenol A condensation product, and a chlorinated biphenyl, said urethane polymer cured by 4,4'-methylene-bis-(2-chloroaniline) employed only in an amount which reacts stoichiometrically with the urethane polymer.

6. A transparent high strength acoustical glass having good sound absorption and energy dissipation qualities over a broad acoustical range, which comprises a plurality of glass plates, adjacent plates being adhesively bonded together by a predetermined thickness of a cured urethane polymer containing epoxy resin, said epoxy resin being in the form of an epichlorohydrin-bisphenol A condensation product, said urethane polymer cured by 4,4'-methylene-bis-(2-chloroaniline) employed only in an amount which reacts stoichiometrically with the urethane polymer.

References Cited

UNITED STATES PATENTS

| | | | |
|---|---|---|---|
| 2,830,038 | 4/1958 | Pattison | 260—830X |
| 2,888,360 | 5/1959 | Sherts et al. | 161—190X |
| 2,906,717 | 9/1959 | Sekmakas | 260—2.5 |
| 3,042,545 | 7/1962 | Kience et al. | 260—830X |
| 3,158,586 | 11/1964 | Krause | 260—830X |
| 3,290,208 | 12/1966 | Lewis et al. | 161—190 |

OTHER REFERENCES

M. J. Bodnar, and E. R. Kelly, "Room-Temperature Curing of Polyurethane Adhesives," Adhesives Age, Vol. 2, April 1959, pp. 29–33.

HAROLD ANSHER, Primary Examiner

R. A. KILLWORTH, Assistant Examiner

U.S. Cl. X.R.

156—330, 331; 161—190, 192; 260—830